Sept. 18, 1945. F. B. STOBER 2,385,310
VEHICLE DIRECTION INDICATING SIGNAL
Filed Jan. 24, 1944 2 Sheets-Sheet 1
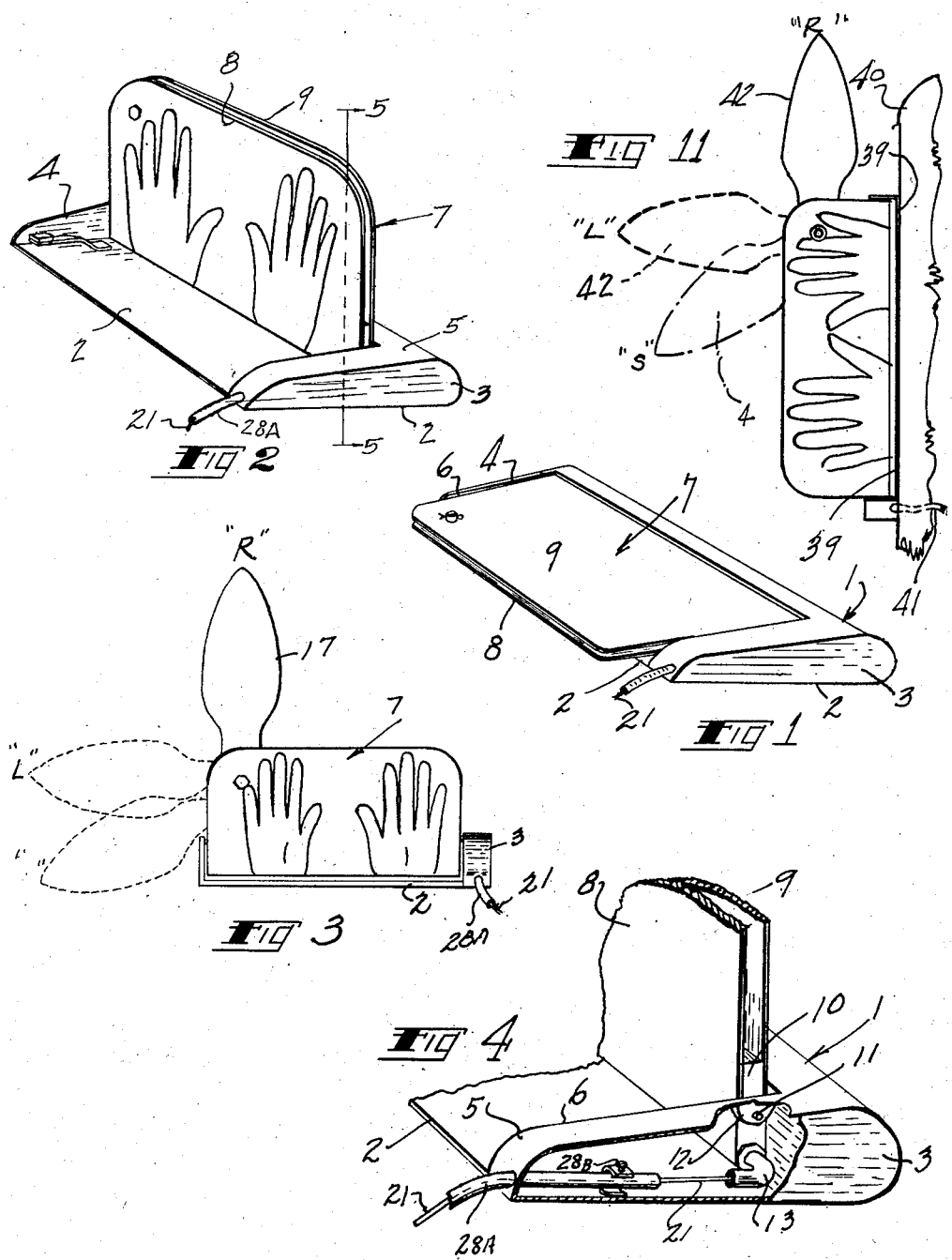
INVENTOR.
FLOYD B. STOBER
ATTORNEY Sept. 18, 1945.    F. B. STOBER    2,385,310
VEHICLE DIRECTION INDICATING SIGNAL
Filed Jan. 24, 1944    2 Sheets-Sheet 2
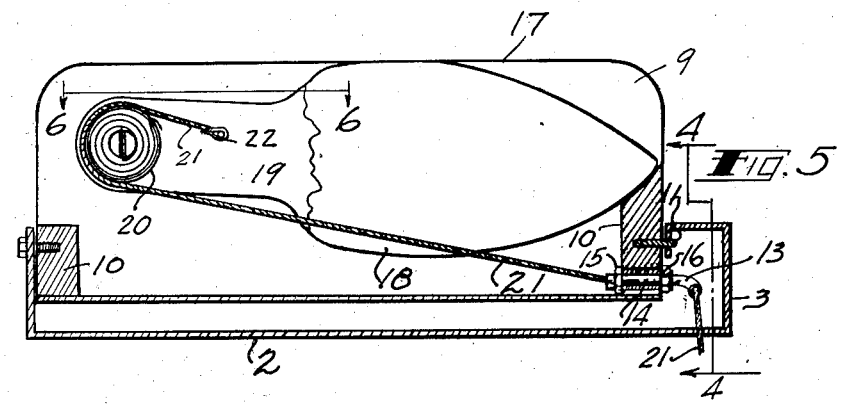
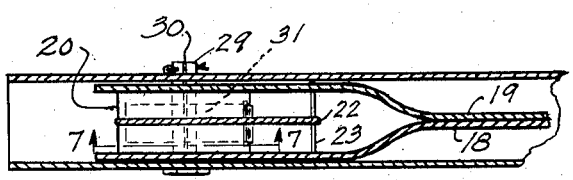
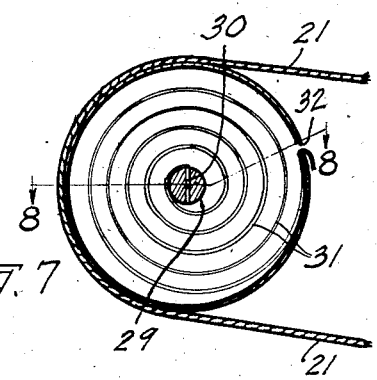
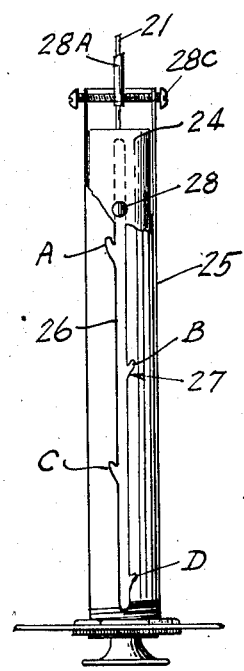
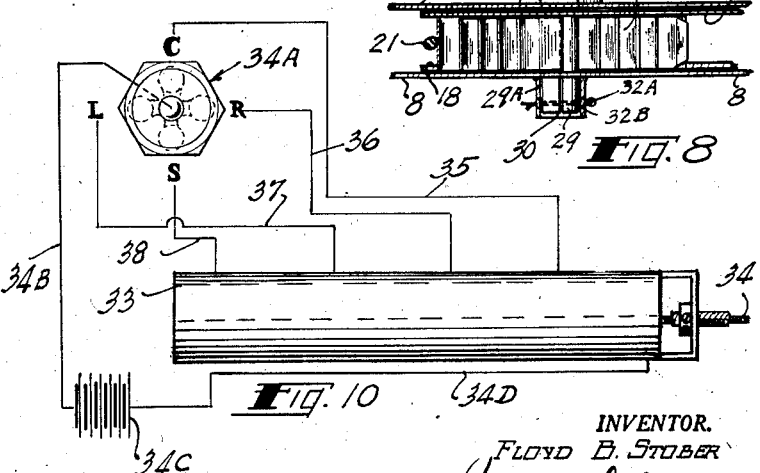
INVENTOR.
FLOYD B. STOBER
BY James D. Girvan
ATTORNEY Patented Sept. 18, 1945

2,385,310

UNITED STATES PATENT OFFICE 2,385,310

VEHICLE DIRECTION INDICATING SIGNAL

Floyd B. Stober, Portland, Oreg.

Application January 24, 1944, Serial No. 519,471

4 Claims. (Cl. 116—35)

This invention relates to improvements in vehicle direction indicating signals.

It is one of the principal objects of the invention to provide a device of this character which when at rest in an inoperative position is of flat streamline construction and particularly well adapted for horizontal or vertical placement in most any desired location on the body or fenders of a vehicle.

A further object of the invention is the provision of means for first presenting a caution warning to an oncoming vehicle or pedestrian in advance of a signal indicating the contemplated direction of turn or other movement or the stopping of the vehicle to which the device is applied.

A still further object is the provision of remote control means disposed within convenient reach of the operator of the vehicle for quickly and positively flashing the caution signal and subsequent direction indicating signals.

The foregoing and other objects will appear as my invention is more fully hereinafter described in the following specification illustrated in the accompanying drawings, and finally pointed out in the appended claims.

In the drawings:

Figure 1 is a perspective view of the invention in a collapsed or inoperative position.

Figure 2 is a perspective view of the device showing the caution signal in an operative position.

Figure 3 is an elevation of the device with the caution signal and the direction indicating signal or semaphore in various operative positions. The full and broken lines in this view illustrate the approximate range of operation of the indicating signal.

Figure 4 is an enlarged sectional perspective view taken approximately on the line 4—4 of Figure 5.

Figure 5 is a longitudinal sectional view taken on the line 5—5 of Figure 2, and showing the caution signal in an operative position and the semaphore in an inoperative position.

Figure 6 is an enlarged sectional plan view taken on the line 6—6 of Figure 5.

Figure 7 is an enlarged sectional detail view taken on the line 7—7 of Figure 6.

Figure 8 is an enlarged sectional plan view taken on the line 8—8 of Figure 7.

Figure 9 is a plan view of mechanical control means with a fragment broken away for convenience of illustration.

Figure 10 is a plan view and wiring diagram of electrical control means in the form of a solenoid and actuating switch therefor.

Figure 11 illustrates the device in an operative position mounted vertically to the side of a vehicle.

Referring now more particularly to the drawings:

Reference numeral 1 indicates generally the main body of the invention in the form of a housing of streamline construction comprising a base 2, end walls 3 and 4, and a cover 5 merging around the forward end of the housing with the base 2. The cover is cut-out as at 6 to form a rectangular opening to embrace a sheath 7 having two walls 8 and 9, spaced apart as shown by suitable spacer blocks, or the like, as indicated at 10. Either or both walls of the sheath is provided with any desired form of caution warning such for instance as a pair of hands as shown, which become visible to the driver of an oncoming vehicle or pedestrian when the sheath is swung out of the housing. The sheath is pivotally mounted to the cover 5 of the housing by means of pivot pins 11 extending outwardly from the spacer blocks 10 and extending through bearings formed in brackets 12 formed integral with and depending from the cover. To one corner of the sheath I rotatably mount an L shaped tube 13 which extends through and is rotatably embraced by a bushing 14 (see Fig. 5) which is attached to the spacer block 10 by means of nuts 15 and 16 threaded to both of its ends.

Between the two walls of the sheath is pivotally mounted for swingable movement a signal arm or semaphore 17 having double wall thickness as at 18 and 19 as shown in Figures 5 and 6. These walls are spread apart at one of their ends and held in parallel spaced relation as shown by means of a drum 20 around which is wound an actuating cable 21 whose one end is attached as at 22, by means of a pin 23, to both walls of the indicating arm. The opposite end of the cable 21 extends through the pivotally mounted L shaped tubular member 13 which as previously stated is pivotally mounted through the spacer block 10 between the walls of the sheath 7. The cable 21 extends to any desired point within convenient reach of the operator of the vehicle and terminates as shown in Figure 9 in a plunger 24 which is slidably mounted within a cylinder 25 which is slotted throughout its length as at 26 and notched as at 27 to progressively or selectively receive a stud 28 projecting outwardly from the plunger 24. The cable 21 extends through a flexible casing 28A whose ends are adjustably secured by set screws as at 28B and 28C to the housing 1 and cylinder 25 respectively. By this arrangement the distance between the cylinder and the housing may be varied and fixed to provide for necessary variations in the operating positions of the sheath and the semaphore. Each notch in the cylinder 25 represents a predetermined setting of the signal, for example, when the device is mounted horizontally, pulling the plunger 24 to engage the stud 28 with the notch A will move the sheath into a vertical position to present the caution warning only, as shown in Figures 2 and 5. Further movement of the plunger, until the stud engages the notch B will move the semaphore 17 into the vertical position R as shown in Figure 3 to signal a right turn. The notch C sets the semaphore into its horizontal position L as shown in dotted lines in Figure 3 to indicate a left turn, and still further movement of the plunger to place the stud in the notch D will swing the semaphore into a downwardly inclined position S as shown in broken lines in Figure 3 to indicate that the vehicle is coming to a stop.

The semaphore 17 is pivotally mounted to the walls of the sheath by means of a pin 29 extending therethrough and also through the drum 20. One end of the pin is journaled in a bearing 29A and is slotted as at 30 for a portion of its length for engaging one end of a coil spring 31, housed within the drum, and whose opposite end engages the drum through a slot 32. By means of the slot 30, the pin 29 may be conveniently rotated by a coin or screw driver for regulating the tension on the spring and held in its regulated position by a cotter-pin, or the like, 32A extending through the slot and through apertures 32B in the walls of the bearing 29A.

The initial pull on the cable 21 swings the sheath into the vertical position shown in Figures 2 and 5 without disturbing the semaphore which remains inactive under the influence and resistance of the spring 31 until a further pull is exerted upon the cable which overcomes the resistance of the spring and causes the semaphore to be swung up out of the sheath and into a selected position.

The alternate form of control means shown in Figure 10 comprises a solenoid 33 whose core is connected by any approved means with the control cable 34. A switch, generally indicated at 34A, and preferably a toggle switch, is disposed at any convenient location within reach of the operator, and connected by wire 34B with a source of electricity as a battery indicated at 34C. One end of the solenoid is connected by wire 34D with the battery. The switch is provided with four contacts C, R, L, and S representing "Caution," "Right-turn," "Left-turn," and "Stop," respectively, and each contact is connected by wires 35, 36, 37 and 38 respectively, with take-off leads from the solenoid. Thus by closing the contact C, for example, the core of the solenoid will move to the first take-off lead and thereby pull the control cable a sufficient distance to swing the sheath up into a vertical position to present the "Caution" warning as aforesaid. Individual closing of the other contacts will of course move the core into positions to cause corresponding movement of the semaphore into the desired or selected positions.

In the alternate form of mounting the device vertically as illustrated in Figure 11, the base 39 is attached to a vertical wall or panel 40 of the vehicle. The shapes of the housing, sheath and semaphore are identical with those of the preferred form but the operating elements are transposed as follows: The control cable 41 enters the left hand side or bottom of the housing to connect with its related parts instead of the right hand side as viewed in Figure 3. The semaphore is swingably mounted to the right instead of to the left of the sheath as viewed in Figure 3 or to the upper end thereof as viewed in Figure 11.

Whether the device is installed horizontally or vertically the cylinder 25 and control cable operating plunger 24 function the same. When the device is installed vertically the initial pull on the plunger 24 to engage the stud 28, with the notch A causes the sheath to swing outwardly from the housing into the position shown in Figure 11 to present the caution warning. A further pull to engage the stud 28 with the notch B causes the semaphore 42 to swing into a 45° downward position S to indicate a stop. Further movement of the plunger 24 to cause the stud 28 to engage with the notch C will swing the semaphore into its horizontal dotted line position L in Figure 11 to indicate a left turn and final disposition of the stud 28 in the notch D will cause the semaphore to swing into a vertical position R indicating a right turn. The corresponding operation of the switch 34A in Figure 10 of the electrical control will cause similar movement of the sheath and semaphore with respect thereto.

It is to be understood that in either case the plunger may be manipulated lengthwise of its cylinder and held in position to operate the signals without necessarily engaging the stud 28 with the notches. Moreover, the sheath and the semaphore may be swung back and forth to present a wig-wag warning by imparting reciprocal movement to the plunger.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. A vehicle direction indicating signal comprising a housing adapted to be mounted on a vehicle, a sheath hingedly mounted to the housing, a semaphore pivotally attached to the sheath, and remote control means operatively connected with the sheath and semaphore for first swinging the sheath outwardly from the housing into contact with a stop means and then swinging the semaphore outwardly from the sheath into various positions to indicate predetermined maneuvers of the vehicle.

2. A vehicle direction indicating signal, comprising a housing adapted to be mounted on a vehicle in a horizontal or vertical position, a sheath hingedly mounted to the housing and adapted to be embraced thereby when in an inoperative position, a semaphore pivotally attached to the sheath, remote control means operatively connected with the sheath and the semaphore for first swinging the sheath outwardly from the housing into contact with a stop means and progressively or selectively swinging the semaphore outwardly from the sheath into various positions to indicate predetermined maneuvers of the vehicle.

3. A vehicle direction indicating signal, comprising a housing adapted to be mounted on a vehicle in a horizontal or vertical position, a sheath hingedly mounted to the housing and adapted to be embraced thereby when in an inoperative position, a semaphore pivotally attached to the sheath, remote control means operatively connected with the sheath and the semaphore for first swinging the sheath outwardly from the housing into contact with a stop means and progressively or selectively swinging the semaphore outwardly from the sheath into various positions to indicate predetermined maneuvers of the vehicle, and resilient means for returning the semaphore to the sheath during movement of the control means toward its inoperative position.

4. A vehicle direction indicating signal comprising a hollow housing of substantially flat and rectangular formation adapted to be vertically or horizontally mounted on a vehicle, a sheath of double wall thickness hingedly mounted to the housing for inward and outward movement with respect thereto and adapted to be embraced by the housing and to lie flush with one wall thereof when in an inoperative position, a semaphore pivotally attached to the sheath between the walls thereof, remote control means operatively connected through resilient means with the sheath and the semaphore for first swinging the sheath outwardly from the housing into contact with a stop means and then the semaphore into progressive or selective positions with respect to the sheath to indicate predetermined maneuvers of the vehicle.

FLOYD B. STOBER.